(12) United States Patent  
Rogers et al.

(10) Patent No.: US 12,415,639 B2  
(45) Date of Patent: Sep. 16, 2025

(54) CAPSULE FILLING LINES

(71) Applicant: Koninklijke Douwe Egberts B.V., Utrecht (NL)

(72) Inventors: Neil Rogers, Banbury (GB); Kornelius Waechter, Berlin (DE); Sven Jaetzlau, Berlin (DE)

(73) Assignee: Koninklijke Douwe Egberts B.V., Utrecht (NL)

( * ) Notice: Subject to any disclaimer, the term of this patent is extended or adjusted under 35 U.S.C. 154(b) by 122 days.

(21) Appl. No.: 17/802,941

(22) PCT Filed: Feb. 25, 2021

(86) PCT No.: PCT/EP2021/054705  
§ 371 (c)(1),  
(2) Date: Aug. 26, 2022

(87) PCT Pub. No.: WO2021/170728  
PCT Pub. Date: Sep. 2, 2021

(65) Prior Publication Data  
US 2023/0034774 A1 Feb. 2, 2023

(30) Foreign Application Priority Data  
Feb. 27, 2020 (GB) ...................................... 2002788

(51) Int. Cl.  
  *B65B 29/02* (2006.01)  
  *B08B 7/00* (2006.01)  
  (Continued)

(52) U.S. Cl.  
  CPC .......... *B65B 29/022* (2017.08); *B08B 7/0042* (2013.01); *B23K 26/0869* (2013.01);  
  (Continued)

(58) Field of Classification Search  
  CPC ......... B65B 29/022; B65B 1/04; B65B 7/164; B65B 7/2878; B65B 2210/06;  
  (Continued)

(56) References Cited

U.S. PATENT DOCUMENTS 3,354,604 A * 11/1967 Amberg .................. B65B 7/167  
                                                                                53/329.2  
4,176,507 A * 12/1979 Mancini ................ B65B 7/2878  
                                                                                 53/329.3  
(Continued)

FOREIGN PATENT DOCUMENTS

CN            2801653 Y     8/2006  
CN          104519744 A     4/2015  
(Continued)

OTHER PUBLICATIONS

Combined Search and Examination Report, dated Aug. 12, 2020, Application No. GB2002788.4 (6 pgs.).  
(Continued)

*Primary Examiner* — Dariush Seif  
(74) *Attorney, Agent, or Firm* — Fitch, Even, Tabin & Flannery LLP

(57) ABSTRACT

Apparatus and methods of cleaning a sealing head (23) of a capsule filling line, comprising operating an ablation unit (10) to irradiate the sealing head (23) to ablate a residue off the sealing head (23).

16 Claims, 9 Drawing Sheets

(51) Int. Cl.
| | |
|---|---|
| B23K 26/08 | (2014.01) |
| B23K 26/16 | (2006.01) |
| B29C 65/00 | (2006.01) |
| B29C 65/20 | (2006.01) |
| B29C 65/76 | (2006.01) |
| B29L 31/00 | (2006.01) |
| B65B 1/04 | (2006.01) |
| B65B 7/16 | (2006.01) |
| B65B 7/28 | (2006.01) |
| B65B 51/10 | (2006.01) |
| B65D 85/804 | (2006.01) |

(52) U.S. Cl.
CPC .............. *B23K 26/16* (2013.01); *B29C 65/20* (2013.01); *B29C 65/76* (2013.01); *B29C 66/112* (2013.01); *B29C 66/131* (2013.01); *B29C 66/24221* (2013.01); *B29C 66/53461* (2013.01); *B29C 66/8432* (2013.01); *B29C 66/849* (2013.01); *B29C 66/8762* (2013.01); *B65B 1/04* (2013.01); *B65B 7/164* (2013.01); *B65B 7/2878* (2013.01); *B65B 51/10* (2013.01); *B29L 2031/7174* (2013.01); *B65B 2210/06* (2013.01); *B65D 85/8043* (2013.01)

(58) Field of Classification Search
CPC ... B65B 51/10; B08B 7/0042; B23K 26/0869; B23K 26/16; B29C 65/20; B29C 65/76; B29C 66/112; B29C 66/131; B29C 66/24221; B29C 66/53461; B29C 66/8432; B29C 66/849; B29C 66/8762; B65D 85/8043; B29L 2031/7174
USPC .......................................................... 53/467
See application file for complete search history.

(56) References Cited

U.S. PATENT DOCUMENTS

| | | | | |
|---|---|---|---|---|
| 4,944,132 | A * | 7/1990 | Carlsson ................. | B65B 35/58 53/167 |
| 4,989,393 | A * | 2/1991 | Sell ...................... | B29C 65/7451 53/329 |
| 5,511,363 | A * | 4/1996 | Doede .................... | B65B 57/00 53/374.6 |
| 6,192,948 | B1 | 2/2001 | Claessens | |
| 6,410,883 | B1 * | 6/2002 | Furuta .................... | B29C 33/72 219/121.68 |
| 9,272,312 | B1 * | 3/2016 | Petersen ................. | B08B 7/005 |
| 2009/0214826 | A1 * | 8/2009 | West ..................... | B24B 37/042 451/36 |
| 2014/0311617 | A1 * | 10/2014 | Py ........................ | A61J 1/1425 141/89 |
| 2015/0189891 | A1 * | 7/2015 | Haas ....................... | A21B 3/16 134/1.1 |
| 2016/0158811 | A1 * | 6/2016 | Petersen ................. | B23K 26/55 134/1 |
| 2016/0169531 | A1 * | 6/2016 | Wagner ................... | B32B 5/142 264/400 |
| 2017/0121044 | A1 * | 5/2017 | Castellari ................. | B65B 7/01 |
| 2017/0274590 | A1 * | 9/2017 | Okazaki ................. | B22F 12/222 |
| 2017/0281812 | A1 * | 10/2017 | Dobrinsky ............... | B67D 1/07 |
| 2018/0215598 | A1 * | 8/2018 | Härtel ....................... | B67B 1/04 |
| 2018/0369879 | A1 * | 12/2018 | Coleman ............... | F16B 37/044 |
| 2019/0135466 | A1 * | 5/2019 | Gorbatenko .......... | B65B 29/022 |
| 2019/0143382 | A1 * | 5/2019 | Johnson ............... | B23K 26/402 219/121.68 |
| 2021/0347509 | A1 * | 11/2021 | Giudici ................. | B65B 29/022 |
| 2022/0152893 | A1 * | 5/2022 | Hahn ................... | B29C 45/1615 |
| 2022/0294196 | A1 * | 9/2022 | Gebert ................... | B23K 26/36 |
| 2023/0026269 | A1 * | 1/2023 | Tonelli ................. | A47J 31/3623 |
| 2024/0190071 | A1 * | 6/2024 | Maeda .................... | B22F 12/43 |

FOREIGN PATENT DOCUMENTS

| | | |
|---|---|---|
| CN | 107949443 | 4/2018 |
| CN | 108146665 | 6/2018 |
| CN | 110559190 A | 12/2019 |
| EP | 3476519 | 5/2019 |
| JP | H09169303 A | 6/1997 |
| JP | 2001322131 | 11/2001 |
| JP | 2002114293 | 4/2002 |
| JP | 2002337822 A | 11/2002 |
| JP | 2004284597 A | 10/2004 |
| JP | 2006188264 | 7/2006 |
| JP | 2008222289 A | 9/2008 |
| JP | 2010254302 | 11/2010 |
| JP | 2012188155 A | 10/2012 |
| RU | 2033808 | 4/1995 |
| RU | 2615471 | 4/2017 |
| RU | 2626198 | 7/2017 |
| WO | 9527986 | 10/1995 |

OTHER PUBLICATIONS

International Search Report and Written Opinion of the International Searching Authority, date of mailing Jun. 15, 2021, for International Application No. PCT/EP2021/054705 (12 pgs.).

Second Office Action, date of mail Apr. 11, 2024, Chinese Application No. 202180014626.6, with English translation (18 pgs.).

Office Action, dated Feb. 22, 2023, Russian Patent Application No. 2022124757, 7 pgs.

* cited by examiner

CAPSULE FILLING LINES

CROSS REFERENCE TO RELATED APPLICATIONS

This application is a U.S. national phase application of International Application No. PCT/EP2021/054705, filed Feb. 25, 2021, which claims benefit from United Kingdom Application 2002788.4, filed Feb. 27, 2020, which are each hereby incorporated herein by reference in their entirety.

The present disclosure relates to improvements in or relating to capsule filling lines. The present disclosure includes methods of operating and cleaning a capsule filling line and an ablation unit for a capsule filling line.

BACKGROUND TO THE DISCLOSURE

Capsule filling lines require periodic cleaning and maintenance of their machinery in order to ensure satisfactory performance. Typically cleaning and maintenance procedures require the capsule filling line to be halted while the procedures are carried out. This affects productivity and throughput of the capsule filling line. There is therefore a desire to minimise the time taken to carry out cleaning and maintenance procedures.

Some capsule filling lines comprise sealing heads for sealing capsule lids onto capsule bodies. The sealing heads may be thermal sealing heads. Sealing heads may become contaminated during operation by residue from the filling operations. Such residue may affect the performance of the sealing heads and must therefore be periodically removed. Currently, the residue is often removed by use of wire cleaning brushes. This procedure results in downtime for the capsule filling line. In addition the procedure is labour-intensive and can result in damage to the sealing heads. There is therefore a desire for improved methods for cleaning and maintenance of capsule filling lines that comprise sealing heads.

SUMMARY OF THE DISCLOSURE

In a first aspect the present disclosure provides a method of cleaning a sealing head of a capsule filling line, comprising operating an ablation unit to irradiate the sealing head to ablate a residue off the sealing head.

In a second aspect the present disclosure provides a method of operating a capsule filling line, comprising:
i) supplying the capsule filling line with a supply of capsule bodies and a supply of comestible product;
ii) operating the capsule filling line such that a plurality of filled capsules are produced by at least partially filling each capsule body with the comestible product and operating a sealing head of the capsule filling line to seal each capsule body with a capsule lid; and
iii) intermittently cleaning the sealing head of the capsule filling line;
wherein cleaning the sealing head comprises operating an ablation unit of the capsule filling line to irradiate the sealing head to ablate a residue off the sealing head.

Advantageously, the current applicant has discovered that use of an ablation unit to irradiate the sealing head to ablate a residue off the sealing head results in a reduction in downtime of the capsule filling line. In addition, damage to the sealing heads from the cleaning and maintenance procedure may be very significantly reduced, if not eliminated completely.

These advantages have been found to be particularly true where the comestible product is a powder or granulate. Powders and granulates, for example coffee granules, coffee powder, sugar, and chocolate powder, have been found to be particularly prone to build-up on the sealing heads. This is believed to be due, at least in part, to the powders and granulates having low particle sizes and weights which leads to them tending to become easily aerosolised and suspended in the air in the vicinity of the sealing heads. Thus, in practice it is not usually possible to prevent a proportion of the particles coming into contact with the sealing heads. The problem is exacerbated where the sealing heads are thermal sealing heads. The high temperatures of the thermal sealing heads causes the powders and granules to partially melt and stick to the thermal sealing head on contact. Further, on capsule filling lines the sealing heads may have intricate features, for example ridges and grooves, having small dimensions with desired tolerances as small as 0.1 to 0.2 mm. Build-up of residue The methods and apparatus of the present disclosure have been found to be effective in removing powder and granulate residue from sealing heads, including thermal sealing heads while maintaining the condition of the sealing heads, including intricate features thereof.

Residue from the capsules may also build up on the sealing heads, again in particular where thermal sealing heads are used. As with powdered and granulated comestible product, it has proved difficult to effectively clean off such residue from the sealing heads without damaging the sealing heads.

The methods and apparatus of the present disclosure have also been found to be effective in removing capsule residue from sealing heads, including thermal sealing heads, including intricate features thereof.

In the method of either or both of the first aspect and the second aspect, one or more of the following features may be present:

The ablation unit may comprise a laser and operating the ablation unit may include energising the laser to laser ablate the residue off the sealing head.

The laser may be controlled to sweep, one or more times, a laser beam across the sealing head.

The method may further comprise:
  engaging the ablation unit with the sealing head prior to operating the ablation unit to irradiate the sealing head; and
  disengaging the ablation unit from the sealing head after operating the ablation unit to irradiate the sealing head.

Engaging the ablation unit with the sealing head may comprise engaging a housing of the ablation unit over or against the sealing head.

Engaging the ablation unit with the sealing head may comprise moving the sealing head from a sealing orientation to a cleaning orientation.

Moving the sealing head into the cleaning orientation may comprise rotating the sealing head by greater than 30 degrees, optionally by greater than 45 degrees, optionally by greater than 60 degrees, preferably by 90 degrees, optionally by up to 120 degrees.

In the sealing orientation the sealing head may face downwards. In the cleaning orientation the sealing head may face sideways.

After disengaging the ablation unit from the sealing head the method may further comprise rotating the sealing head back into the sealing orientation.

Engaging the ablation unit with the sealing head may comprise moving the ablation unit from a retracted location to an engaged location.

In the engaged location a laser of the ablation unit may be directed sideways.

Moving the ablation unit into the engaged location may comprise translating the ablation unit in one or more axes.

After disengaging the ablation unit from the sealing head the method may further comprise translating the ablation unit back into the retracted location.

The method may further comprise exhausting gases from a vicinity of the sealing head during ablation of the residue.

The method may further comprise catching dislodged residue beneath the sealing head which may be dislodged from the sealing head during ablation.

The method may further comprise providing a hopper for catching the dislodged residue.

The sealing head may be a thermal sealing head.

The sealing head may be configured for sealing a capsule lid onto a capsule body; and optionally for heat sealing a capsule lid onto a capsule body.

The residue may comprise a powder or granulate. The powder or granulate may be derived from the comestible product.

The residue may comprise an ingredient residue left over from filling capsules with one or more powder or granulated ingredients. The comestible product may comprise a powdered or granulated product; optionally a powdered or granulated beverage product.

The ingredient residue may comprise one or more of chocolate powder, coffee granules, coffee powder, tea powder, milk powder, sugar, soup powder, flavourings and creamer powder.

The residue may comprise a capsule residue left over from sealing capsules.

The capsule residue may comprise plastic, for example polypropylene, polyethylene, polystyrene, polyester, or a laminate of two or more of these materials, or aluminium The method may further comprise providing a sealing head unit comprising a plurality of sealing heads that form a sealing head array and operating the ablation unit to irradiate the sealing head array to ablate a residue off the plurality of sealing heads.

The capsule filling line may comprise a sealing head unit comprising a plurality of sealing heads arranged as a sealing head array; and the method may comprise operating the ablation unit to irradiate the sealing head array to ablate a residue off the plurality of sealing heads.

In a third aspect the present disclosure provides an ablation unit for a capsule filling line comprising:
a support frame for mounting the ablation unit to the capsule filling line;
a radiation emitter for irradiating a sealing head of the capsule filling line;
a housing at least partially surrounding the radiation emitter, the housing comprising an opening permitting, in use, passage of radiation from the radiation emitter towards the sealing head;
a transmission for movement of the housing and radiation emitter between a retracted location and an engaged location.

The radiation emitter may be a laser. The radiation emitter may be mobile within the housing and configured to be traversable along at least one axis of the housing to sweep radiation across a sealing head or plurality of sealing heads.

The opening of the housing may be engageable over or against the sealing head or a sealing head unit to define a substantially enclosed volume containing the sealing head and the radiation emitter.

In the engaged location the opening of the housing and the radiation emitter may be directed sideways.

The transmission may be configured to move the ablation unit into the engaged location by translating the ablation unit in one or more axes relative to the support frame.

The ablation unit may further comprise an exhaust system for exhausting gases from the vicinity of the sealing head. The exhaust system may comprise a plurality of exhaust apertures in the housing which are connected to an exhaust by an exhaust manifold. The plurality of exhaust apertures may be located on an upper face of the housing.

The ablation unit may further comprise a hopper beneath the sealing head for catching dislodged residue.

In a fourth aspect the present disclosure provides a capsule filling line comprising:
a supply of capsule bodies; and
a supply of comestible product;
a conveyor for moving components from a filling station to a sealing station;
the filling station being configured to at least partially fill a capsule body obtained from the supply of capsule bodies with comestible product obtained from the supply of comestible product;
the sealing station comprising a sealing head unit comprising at least one sealing head and being configured to receive the capsule body that is at least partially filled with comestible product and seal said capsule body with a capsule lid;
the capsule filling line further comprising the ablation unit of the third aspect for intermittently cleaning the sealing head of the lidding station.

The capsule filling line may further comprise a lidding station intermediate the filling station and the sealing station for placing the capsule lid on the capsule body.

The at least one sealing head may be a thermal sealing head. The at least one sealing head may be at least one combined lid cutter and thermal sealing head.

The sealing head unit may comprise an array of sealing heads for simultaneously sealing each of a plurality of capsule bodies with a capsule lid.

The sealing head unit may be movable between a sealing orientation and a cleaning orientation. In the sealing orientation the sealing head unit may face downwards. In the cleaning orientation the sealing head unit may face sideways.

The comestible product may comprise one or more of chocolate powder, coffee granules, coffee powder, tea powder, milk powder, sugar, soup powder, flavourings and creamer powder.

The capsule bodies may comprise plastic, for example polypropylene, polyethylene, polystyrene, polyester, or a laminate of two or more of these materials, or aluminium The capsule lids may comprise a heat seal layer; optionally a heat seal layer comprising a thermoplastic; optionally wherein the capsule lids comprise a laminate; optionally wherein the capsule lids comprise flexible die-cut laminate lids. Alternatively, the capsule lid may be cut from a sheet of lid material, for example as part of the sealing step.

BRIEF DESCRIPTION OF THE DRAWINGS

One or more embodiments of the disclosure will now be described, by way of example only, with reference to the accompanying drawings in which.

DETAILED DESCRIPTION

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to embodiments of the disclosure. The description of the embodiments is not meant to include all the possible embodiments of the disclosure that are claimed in the appended claims. Many modifications, improvements and equivalents which are not explicitly recited in the following embodiments may fall within the scope of the appended claims. Features described as part of one embodiment may be combined with features of one or more other embodiments unless the context clearly requires otherwise.

Figure 1:
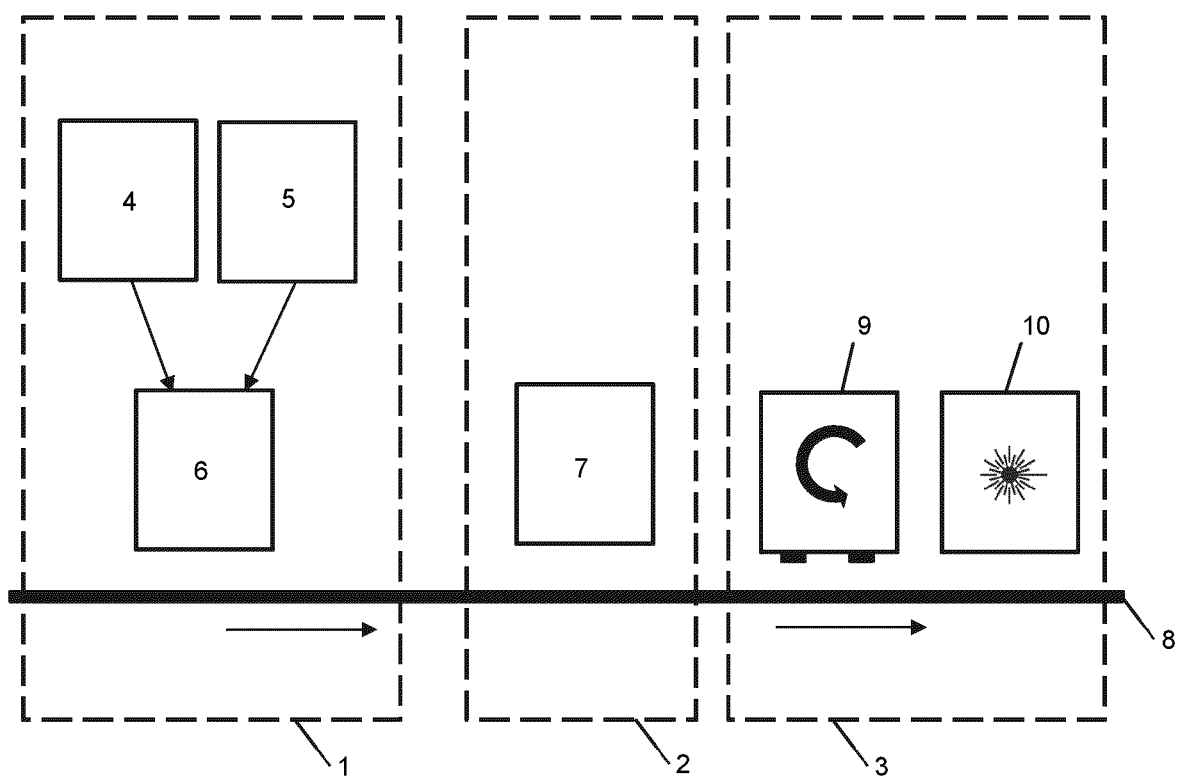
FIG. 1 is a schematic representation of a capsule filling line according to the present disclosure.

The capsule filling line may comprise one or more of a filling station 1, a lidding station 2 and a sealing station 3. FIG. 1 shows schematically an example capsule filling line according to the present disclosure which comprises a filling station 1, a lidding station 2 adjacent to the filling station 1, and a sealing station 3 adjacent to the lidding station 2. A conveyor 8 is provided for moving components from the filling station 1 to the sealing station 3 via, in this example, the lidding station 2.

The filling station 1, the lidding station 2 and the sealing station 3 may be spatially distinct and may be provided at different physical locations within, for example, a factory. Alternatively, the filling station 1, the lidding station 2 and the sealing station 3 may be co-located at the same location or immediately adjacent one another. The filling station 1, the lidding station 2 and the sealing station 3 may be provided as part of one machine.

The lidding station 2 may in particular be provided when pre-cut capsule lids are utilised. Alternatively, the capsule filling line may cut capsule lids from a sheet of lid material as part of the sealing step performed at the sealing station 3. Consequently, a separate lidding station may be dispensed with in these cases. In such examples the sealing station 3 may function as a combined lid cutting and sealing station.

The conveyor 8 may be a means for moving components between different physical locations within, for example, a factory or may be a means for moving, orientating or otherwise handling components at a single location.

In the example of FIG. 1, the filling station 1 comprises a supply of capsule bodies 4, a supply of comestible product 5, and a filling mechanism 6. The lidding station 2 comprises a supply of capsule lids 7, for example one or more stacks of pre-cut lids. The sealing station 3 comprises a sealing head unit 9 and an ablation unit 10.

The capsule filling line may be configured to a fill and lid a variety of different types of capsule. The capsule filling line finds particular advantage for the filling of capsules where the comestible product is a powder or granulated product. For example the comestible product may comprise one or more of chocolate powder, coffee granules, coffee powder, tea powder, milk powder, sugar, soup powder, flavourings and creamer powder.

The capsule filling line finds particular advantage for the filling of capsules formed at least in part from a plastic, in particular a thermoplastic. For example, the capsule filling line is particularly suitable for the filling of capsules wherein the capsule bodies are plastic, in particular thermoplastic. Suitable plastics include, but are not limited to, polypropylene, polyethylene, polystyrene, polyester, or a laminate of two or more of these materials. The capsule filling line may also be used with capsule bodies comprising other materials, for example those comprising aluminium.

Additionally or alternatively, the capsule filling line is particularly suitable for the filling of capsules wherein the lids comprise a heat seal layer. The heat seal layer may comprise a thermoplastic. The capsule lids may comprise a laminate.

The capsule lids may comprise flexible die-cut laminate lids that may be pre-cut and may be held in the supply of capsule lids 7. In one example the lid may comprise an aluminium layer and a polypropylene heat seal layer. Such a lid may be lidded onto a plastic capsule body or a capsule body formed from other materials, for example those comprising aluminium.

Alternatively, the capsule lids may be cut, stamped or otherwise formed from a sheet of lid material during the sealing step. For example, a sheet of foil laminate may be overlaid the capsule bodies during the sealing step. The sealing station may then cut out and seal the capsule lid to the capsule body in one operation. The foil laminate of the lid material may comprise, for example, an aluminium layer and a polypropylene heat seal layer.

Figure 2:
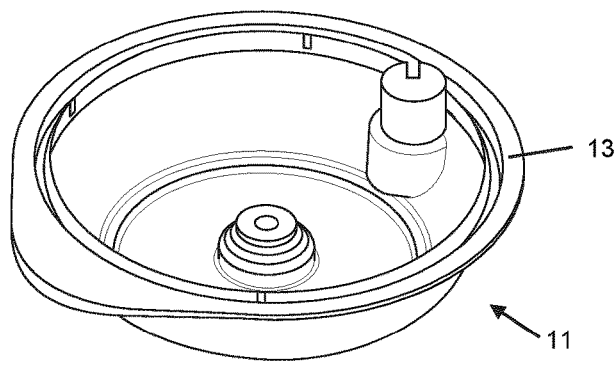
FIG. 2 is a perspective view of a capsule body.
Figure 3:
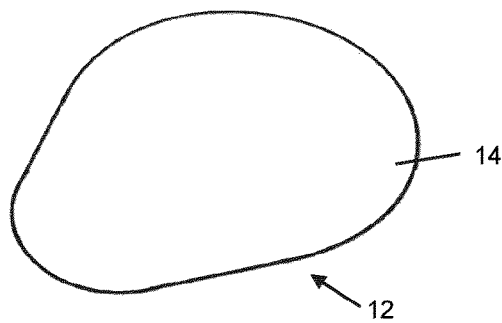
FIG. 3 is a perspective view of a capsule lid.

In the following description, by way of example only, the capsule filling line will be exemplified for the filling of capsules wherein each capsule is formed from a capsule body 11 as shown in FIG. 2 and a capsule lid 12 as shown in FIG. 3. The capsule body 11 and the capsule lid 12 are of a type sold under the brand name Tassimo® and are more fully described in GB2397506A, the contents of which are hereby incorporated by reference in their entirety. The capsule body 11 may comprise a bowl-shaped body defining an interior void for receiving comestible product and a flange 13. The capsule body 11 may be formed from polypropylene. The capsule lid 12 may be a die-cut lid that is shaped to close the bowl-shaped body of the capsule body 11 with a peripheral edge 14 of the capsule lid 12 being sealed, during lidding, to the flange 13. The capsule lid 12 may be formed from a laminate having a layer of aluminium and a layer of polypropylene. The polypropylene layer may function as a heat seal layer that forms a PP-PP bond with the flange 13.

The filling station 1 is configured to at least partially fill a capsule body 11 obtained from the supply of capsule bodies 4 with comestible product obtained from the supply of comestible product 5.

The filling mechanism 6 of the filling station 1 may provide means for transporting capsule bodies 11 from the supply of capsule bodies 4 to a filling location on the capsule filling line. The filling mechanism 6 may further provide means for conveying comestible product from the supply of comestible product 5 to the filling location. For example such means may be one or more hoses connecting a product hopper to the filling location. Dosing means may also be provided to control the quantity of comestible product filled into the capsule body 11.

The capsule bodies 11 may each be orientated at the filling station 1 with the mouth of the bowl-shaped body facing upwards and the comestible product may then be deposited into the interior void of the capsule body 11.

Typically the filling station 1 will fill a plurality of capsule bodies 11 simultaneously. For example, 2, 4, 20, 24, 32, 40 or more capsule bodies 11 may be filled at the same time.

The capsule bodies 11 containing the comestible product may then be moved by the conveyor 8 to the lidding station 2. The lidding station 2 may provide means for picking capsule lids 12 from the supply of capsule lids 7 and placing them on the capsule bodies 11. Alternatively, such means may be provided, as noted above, as part of the sealing station 3 or at another station of the capsule filling line.

The capsule bodies 11 containing the comestible product and with the capsule lids 12 in place may then be moved by the conveyor 8 to the sealing station 3.

Figure 4:
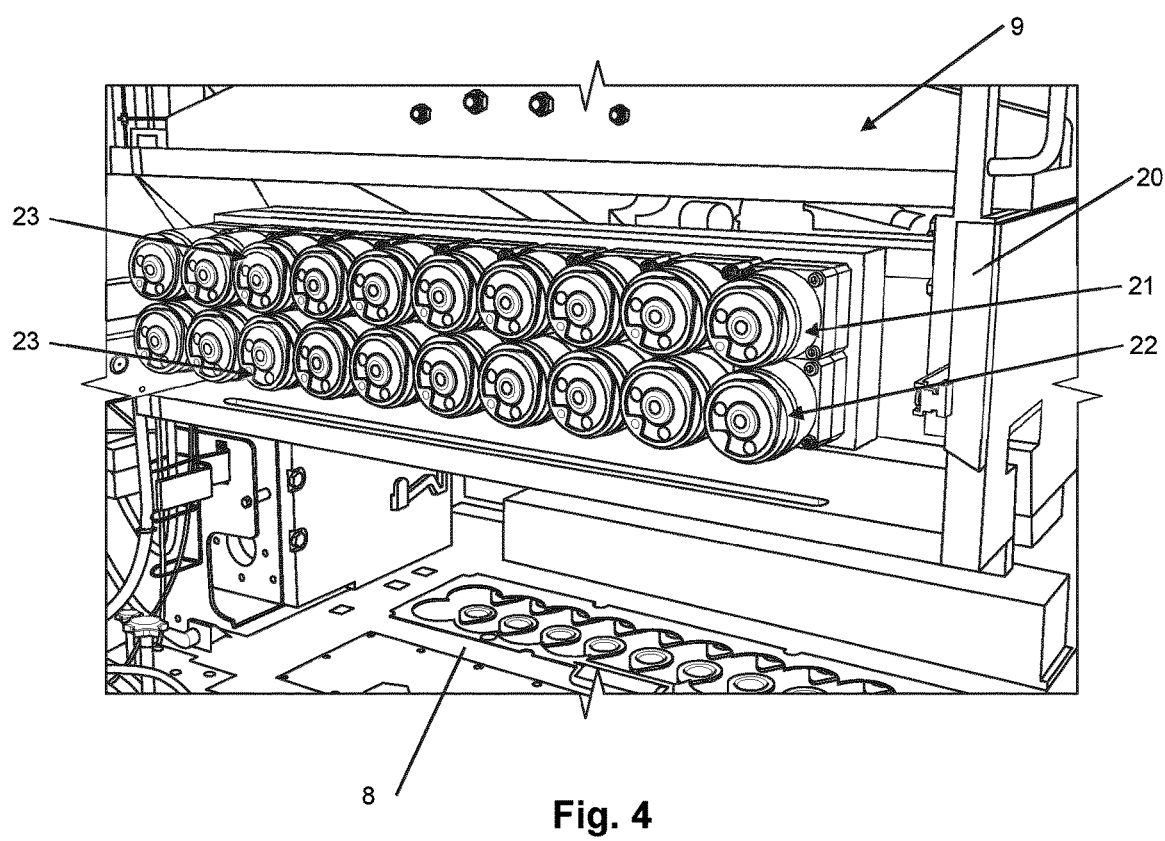
FIG. 4 is a picture of a sealing head unit of the present disclosure in a cleaning orientation.

As shown in FIG. 4, the sealing station 3 may comprise a sealing head unit 9 comprising at least one sealing head 23 being configured to seal the capsule lids 12 to the capsule bodies 11.

The sealing head unit 9 may comprise a housing 20 and a plurality of sealing heads 23 to permit a plurality of capsule bodies 11 to be sealed simultaneously. For example, 2, 4, 20, 24, 32, 40 or more sealing heads 23 may be provided. The sealing head unit 9 may comprise two arrays of sealing heads 23—an upper array 21 and a lower array 22.

The or each sealing head 23 may be a thermal sealing head.

Each sealing head 23 may be shaped as required to seal the capsule lid 12 to the capsule body 11. In the illustrated example, each sealing head 23 comprises a shaped sealing portion that matches at least the shape of the flange 13 of the capsule body 11.

The sealing head unit 9 may be movable between a sealing orientation and a cleaning orientation. In the sealing orientation the sealing head unit 9 may faces downwards so as to present the sealing heads 23 downwardly. In the cleaning orientation (as shown in FIG. 4) the sealing head unit 9 may faces sideways so as to present the sealing heads 23 to the side. The sealing head unit 9 may be rotatable between the two configurations.

The capsule filling line further comprises an ablation unit 10 for intermittently cleaning each sealing head 23 of the sealing head unit 9 of the sealing station 3.

Figure 5:
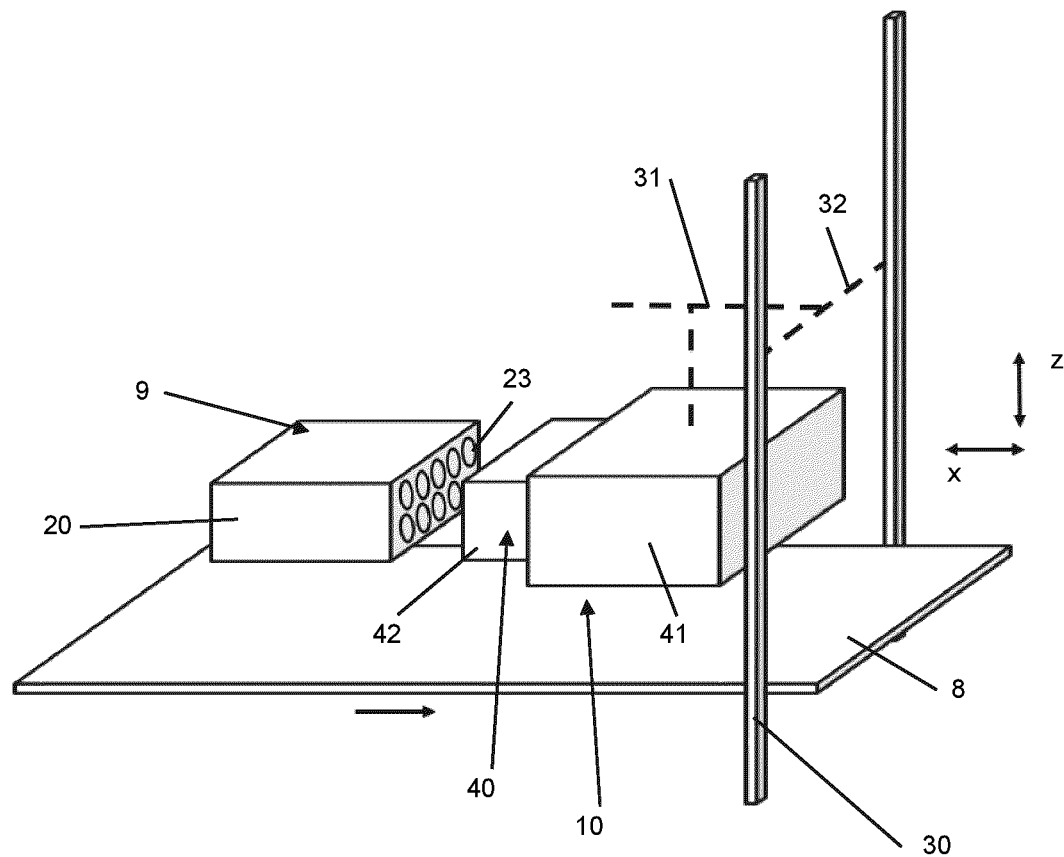
FIG. 5 is a schematic representation of a portion of a capsule filling line according to the present disclosure.
Figure 6:
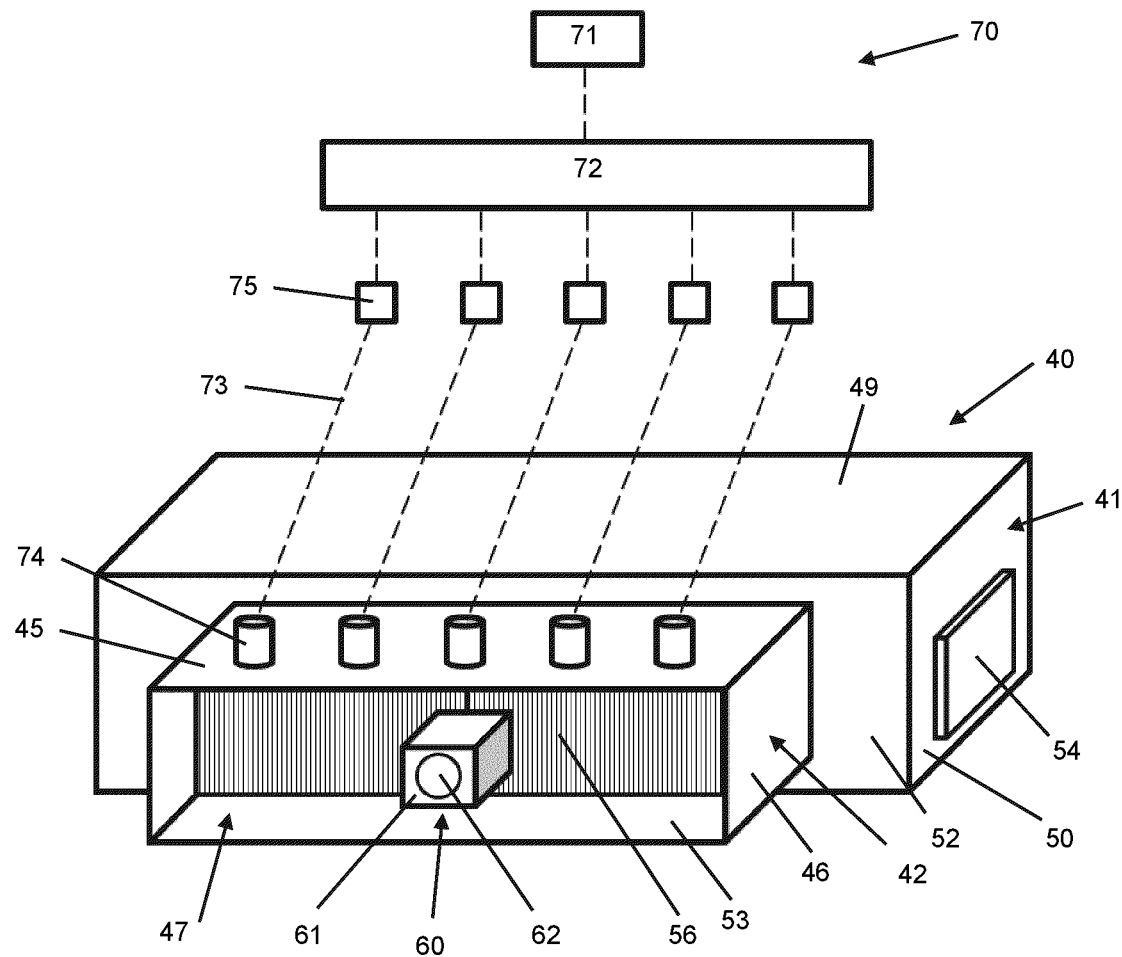
FIG. 6 is a schematic representation of a portion of an ablation unit according to the present disclosure.
Figure 7:
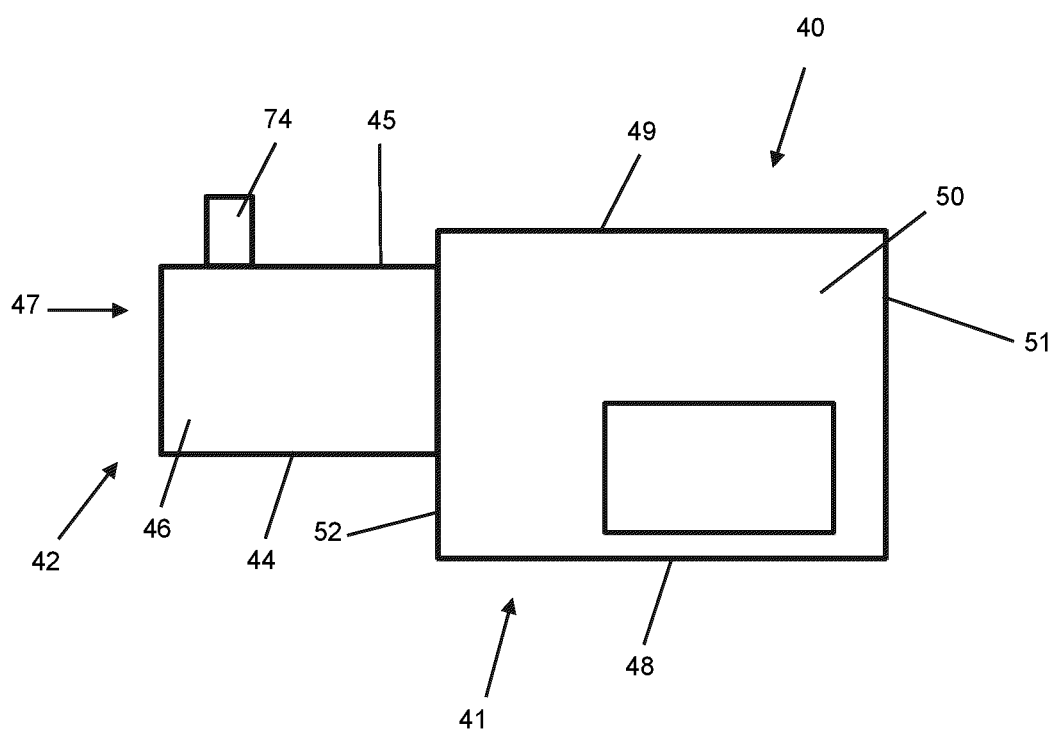
FIG. 7 is a side schematic view of a portion of the ablation unit shown in FIG. 6.

An example of the ablation unit 10 is shown in FIGS. 5 to 7. The ablation unit 10 comprises a support frame 30 for mounting the ablation unit 10 to the capsule filling line and a housing 40 that at least partially surrounds a radiation emitter 60. The radiation emitter 60 is provided for irradiating, in use, the or each sealing head 23 of the capsule filling line. The radiation emitter 60 may be operatively connected to a source of radiation that is located outside the ablation unit 10.

The housing 40 may comprise a rear portion 41 and a front portion 42. The front portion 42 may project from the rear portion 41. The housing 40 and in particular the front portion 42 thereof may comprise an opening 47 permitting, in use, passage of radiation from the radiation emitter 60 towards the or each sealing head 23.

The rear portion 41 may comprise a bottom face 48, an upper face 49, lateral faces 50 and a rear face 51. A front face 52 opposite the rear face 51 may have mounted thereto the front portion 42. An opening in the front face 52 may be provided shaped and sized to match a rear face of the front portion 42 such that communication between the rear portion 41 and front portion 42 is enabled. A curtain mechanism 56 may be provided between the front portion 42 and the rear portion 41. The radiation emitter 60 may protrude through the curtain mechanism 56. The curtain mechanism 56 may comprise a pair of bellow, curtains, partitions or similar that permit the radiation emitter 60 to traverse along the front portion 42 while maintaining a closed or substantially closed partition between the front portion 42 and the rear portion 41.

The front portion 42 may be shallower than the rear portion 41 such that the front portion 42 projects from an upper region of the rear portion 41. The faces of the rear portion 41 may define an interior in which may be housed components of the ablation unit 10. These may include at least a portion of the radiation emitter 60. An access panel 53 may be provided for accessing the interior of the rear portion 41 for maintenance and cleaning.

The front portion 42 may comprise an upper face 45, lateral faces 46 and a lower face 44. The opening 47 may form the front face of the front portion 42. As noted above, the rear face may adjoin the front face 52 of the rear portion 41 and be separated therefrom by the curtain mechanism 56.

The radiation emitter 60 is preferably a laser emitter. The radiation emitter 60 may be operatively connected to a laser source that is located outside the ablation unit 10. For example, the laser source may be coupled to the radiation emitter 60 by means of an optical cable. An example of a suitable laser may have a continuous wave power of 100 W or greater, preferably 150 W or greater. The laser may have a maximum pulse power of 200 KW or greater, preferably 250 KW or greater. The pulse frequency of the laser may be 12-40 KHz. The laser may have a wavelength of 1064 nm.

The radiation emitter 60 may be mobile within the housing 40. For example the radiation emitter 60 may be configured to be traversable along at least one axis of the housing 40 to sweep radiation across the or each sealing head 23. In the illustrated example the radiation emitter 60 may comprise a laser head unit 61 and a laser emission window 62. The laser head unit 61 may be mounted within the rear portion 41 of the housing 40 on a linear drive mechanism. The laser head unit 61 may extend into the front portion 42 of the housing 40 through the curtain mechanism 56 and the laser emission window 62 may be orientated to point towards the opening 47.

The laser head unit 61 may be moved along the front portion 42 by the linear drive mechanism so as to traverse the length of the front portion 42 in order that laser radiation emitted through the laser emission window 62 can be swept across the sealing heads 23 of the sealing head unit 9.

The laser head unit 61 may be configured to sweep at a fixed speed along the front portion 42. Alternatively, the linear drive mechanism may be configured to locate the laser head unit 61 in a plurality of discrete locations sequentially. For example, a standby location and two, three, four, five or more ablation locations may be configured. At each ablation location the laser head unit 61 may be configured to irradiate one or more sealing heads 23 of the sealing head unit 9. The laser head unit 61 may comprise 2D optics to allow, from each ablation location, a linear beam of radiation (e.g. laser light) to be swept over one or more of the sealing heads 23. In the illustrated example, a standby location and five ablation locations are configured and at each ablation location the 2D optics allow two sealing heads 23 of the upper array 21 and two sealing heads of the lower array 22 to be irradiated.

The ablation unit 10 may further comprise an exhaust system 70, as shown in FIG. 6, for exhausting gases from the vicinity of the sealing heads 23. The exhaust system 70 may comprise a plurality of exhaust apertures 74 in the housing 40 which are connected to an exhaust line 71 by an exhaust manifold 72. The plurality of exhaust apertures 74 may be located in the upper face 45 of the front portion 42 of the housing 40. The exhaust apertures 74 may be connected to the exhaust manifold 72 by hoses 73 or similar conduits. Each hose may comprise a control valve 75 permitting flow through each hose 73 to be individually controlled.

As shown in FIGS. 5 and 8 to 10, the ablation unit 10 may further comprise a transmission 31, 32 for movement of the housing 40 including the radiation emitter 60 between a retracted location and an engaged location. The transmission 31, 32 may be configured to move the ablation unit 10 into the engaged location by translating the ablation unit 10 in one or more axes relative to the support frame 30. The transmission 31, 32 may move the ablation unit 10 relative to the support frame 30. The transmission 31, 32 may comprise a first portion 31 for movement of the ablation unit 10 along an x-axis, wherein the x-axis may be parallel to the direction of movement of the conveyor 8. The movement along the x-axis may be translational. The second portion 32 of the transmission 31, 32 may enable movement of the ablation unit 10 along a z-axis, wherein the z-axis may be perpendicular to the direction of movement of the conveyor 8. The movement along the z-axis may be vertical.

Figure 8:
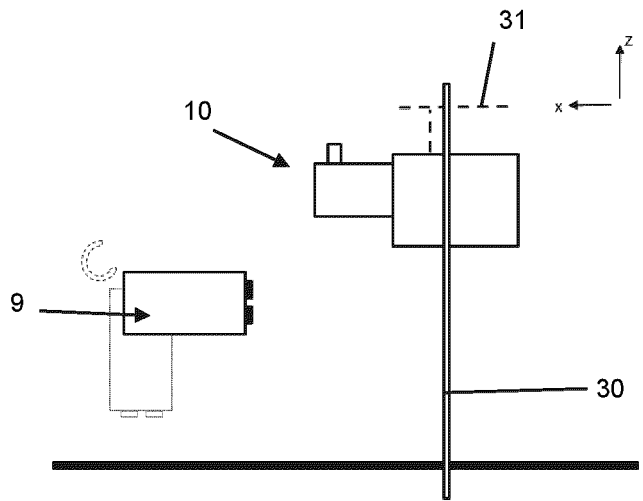
FIGS. 8 to 10 are schematic representations illustrating movement of the ablation unit from a retracted location to an engaged location.
Figure 9:
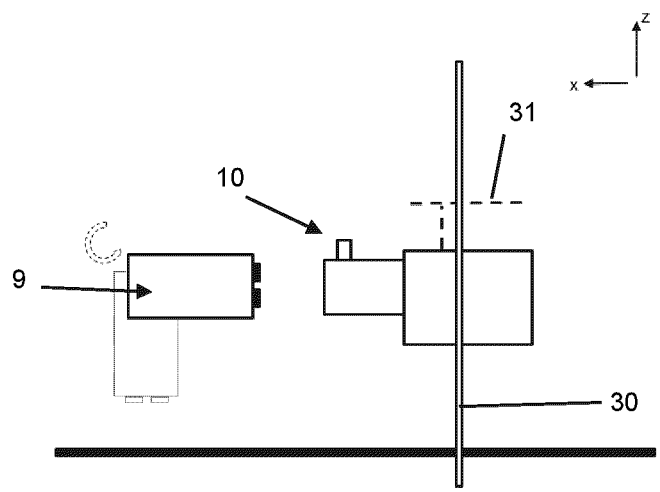
Figure 10:
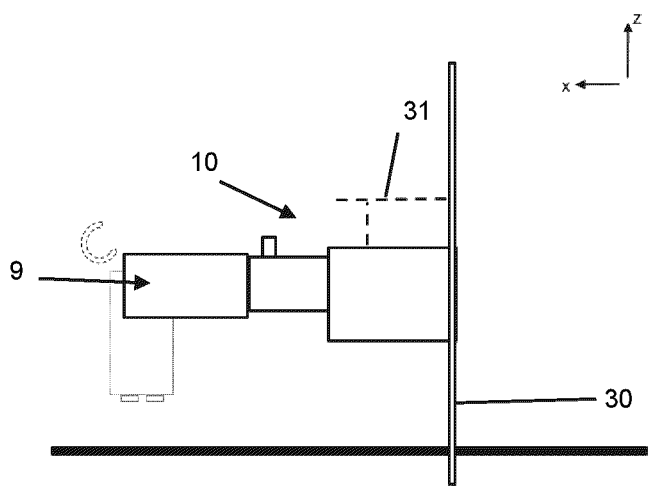

Movement of the ablation unit 10 is illustrated in FIGS. 8 to 10. FIG. 8 shows the retracted location, FIG. 9 shows an intermediate position following a downward vertical movement of the ablation unit 10 along the z-axis. FIG. 10 shows the engaged location.

As shown in FIG. 10, the opening 47 of the housing 40 may be engageable over or against the sealing head unit 9 when the housing 40 is at the engaged location to define a substantially enclosed volume containing the sealing heads 23 and the radiation emitter 60. Beneficially this helps to contain the irradiation and prevent scattering of laser light outside the ablation unit 10. It will be noted that the sealing head unit 9 has been rotated into its cleaning orientation to enable this. In the engaged location the opening 47 of the housing 40 and the radiation emitter 60 may be directed sideways.

As shown in FIG. 8, in the retracted location the ablation unit 10 may be retracted and raised away from the conveyor 8 so as not to obstruct operation of the capsule filling line during filling, lidding and sealing operations. In FIG. 8 the sealing head unit 9 is still shown in its cleaning orientation but is free to be rotated back into its sealing orientation (shown in dotted lines).

Figure 11:
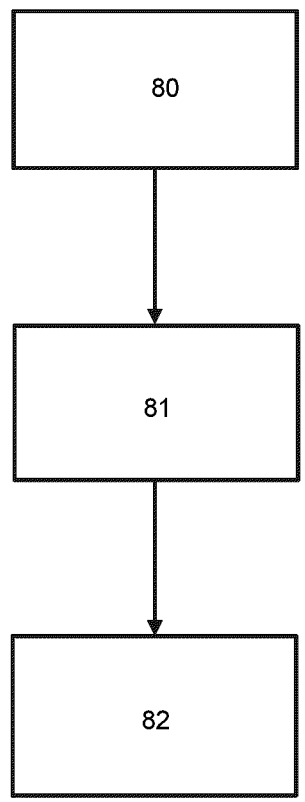
FIG. 11 is a flowchart of a method according to the present disclosure.

FIG. 11 illustrate a method of operating the capsule filling line which comprises at step 80 supplying the capsule filling line with a supply of capsule bodies 11 and a supply of comestible product. At step 81 the capsule filling line is operated such that a plurality of filled capsules are produced by at least partially filling each capsule body 11 with the comestible product and operating one or more sealing heads 23 of the capsule filling line to seal each capsule body 11 with a capsule lid 12. At step 82 the method comprises intermittently cleaning the one or more sealing heads 23 of the capsule filling line by operating the ablation unit 10 to irradiate each sealing head 23 to ablate a residue off each sealing head 23.

In use the ablation unit 10 may be engaged with the sealing head 23 or sealing head unit 9 prior to operating the ablation unit 10 to irradiate the sealing heads 23 and disengaged from the ablation unit 10 after operating the ablation unit 10 to irradiate the sealing heads 23.

Engaging the ablation unit 10 with the sealing heads 23 or sealing head unit 9 preferably comprises engaging the housing 40 of the ablation unit 10 over or against the sealing heads 23.

During the method the sealing head unit 9 may be moved from its sealing orientation to its cleaning orientation. This movement may comprise rotating the sealing head unit 9 by greater than 30 degrees, optionally by greater than 45 degrees, optionally by greater than 60 degrees, preferably by 90 degrees, optionally by up to 120 degrees.

In the sealing orientation the sealing head unit 9 and the sealing heads 23 may face downwards. In the cleaning orientation the sealing heads 23 may face sideways. After disengaging the ablation unit 10 from the sealing head unit 9 the method may further comprise rotating the sealing head unit 9 back into the sealing orientation.

The cleaning operation may comprise irradiating the sealing heads 23 using radiation emitted from the laser head unit 61 of the ablation unit 10.

Figure 12:
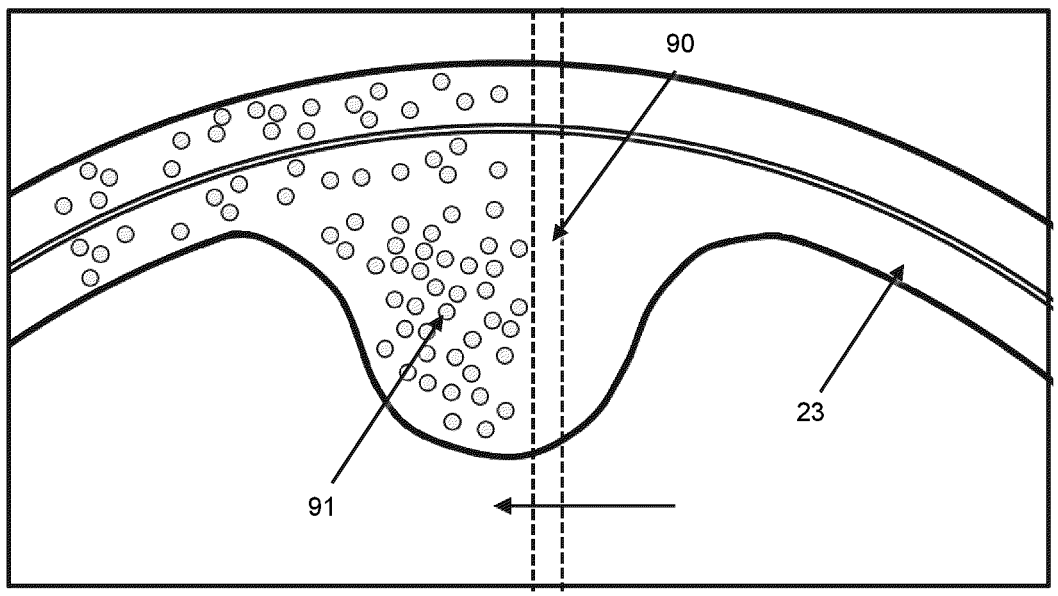
FIG. 12 is a schematic illustration of a portion of a sealing head undergoing laser ablation.

FIG. 12 is a schematic illustration of a portion of a sealing head 23 undergoing irradiation by laser light. The linear laser beam 90 is generated by the 2D optics of the laser head unit 61. In this example the linear laser beam 90 is being steered from right to left, as indicated schematically by the arrow, to sweep across the whole of the sealing head 23. Residue 91 from the comestible product and or the capsule body and or capsule lid is present on the left-hand side of the sealing head 23. The residue on the right-hand side of the sealing head 23 has been removed by the ablating effect of the linear laser beam 90.

During ablation gases may be generated from the ablation of the residue. Consequently, it is preferable to exhaust gases from a vicinity of the sealing heads 23 during ablation by using the exhaust system 70. A negative pressure is applied to the exhaust line 71 by, for example, a vacuum pump or fan. This causes ablation gases and particles of residue that may be dislodged from the sealing heads 23 to be sucked up through the exhaust apertures 74, hoses 73 and exhaust manifold 72 into the exhaust line 71. The control valves 75 may be selectively operated to enable exhaust flow through one or more of the hoses 73 at one time. Preferably, the exhaust apertures 74 are arranged one above each of the ablation locations of the radiation emitter 60. The control valves 75 may be controlled to establish an exhaust flow only through the exhaust aperture 74 and hose 73 associated with the ablation location currently occupied by the radiation emitter 60. This may beneficially reduce the size of vacuum pump or fan required for the exhaust system 70.

Larger particles of residue that may be dislodged during ablation (which may be too large to be exhausted by the exhaust system 70) may drop down within the front portion 42 of the housing 40. These may be caught in a hopper 53 that may be provided at the base of the front portion 42. The hopper 53 may comprise a pan, bowl or depression in the lower face 44 of the front portion 42 or may simply comprise the lower face 44 itself. A raised lip may be provided at the front of the lower face bordering the front opening 47. The dislodged particles may be periodically cleared from the housing 40 via the front opening 47.

Figure 13:
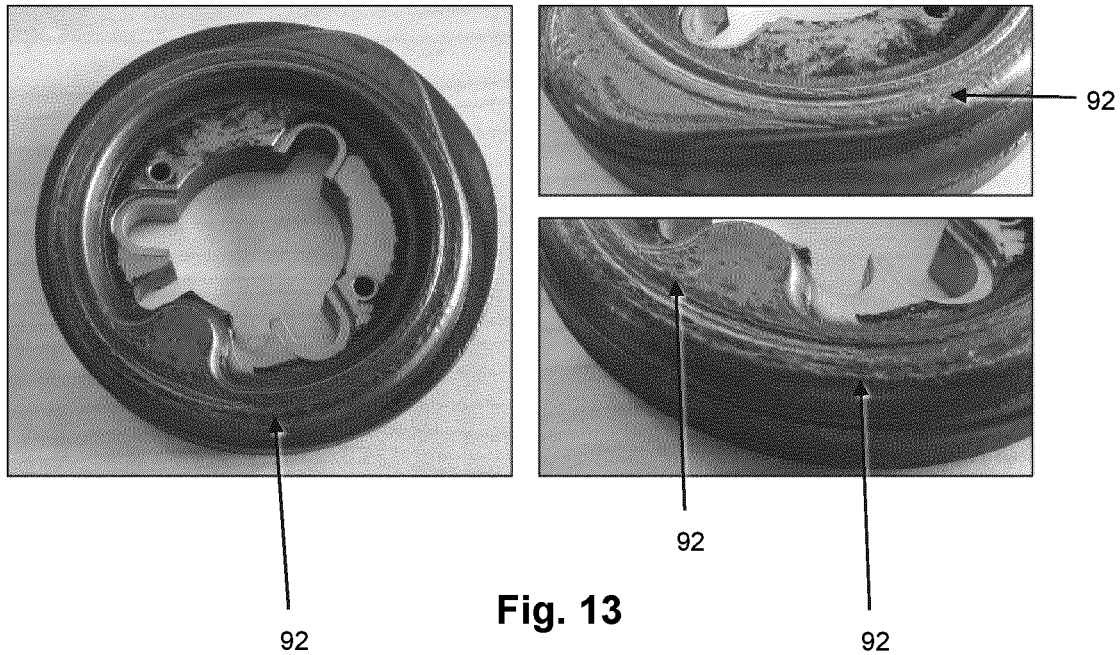
FIG. 13 is a set of three pictures showing a sealing head following 3,000 cleaning cycles using a prior art cleaning method.
Figure 14:
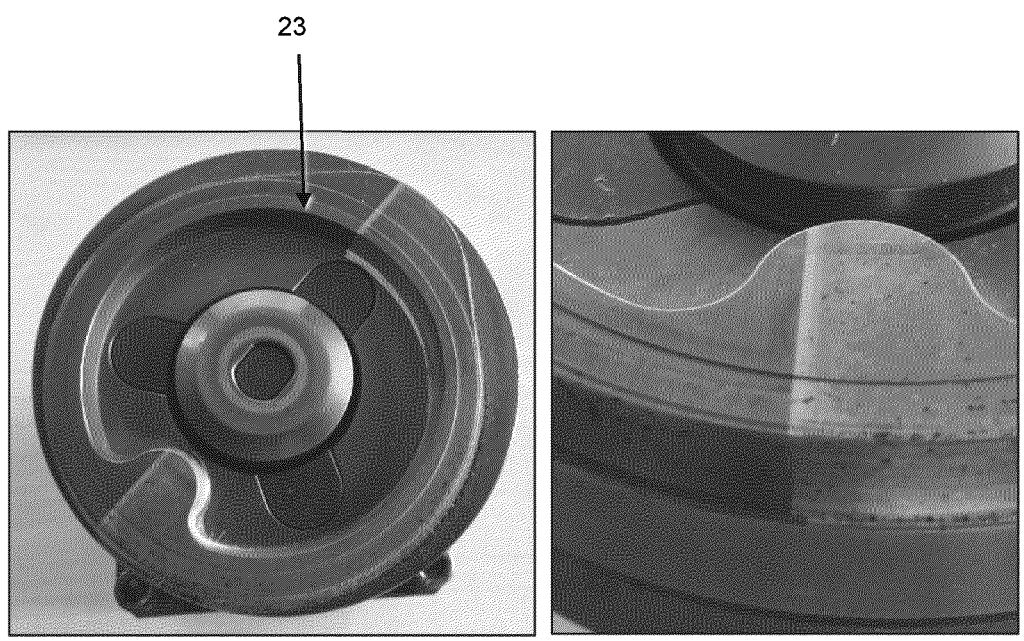
FIG. 14 is a set of two pictures showing a sealing head following 17,000 cleaning cycles according to the present disclosure.

Beneficially, the present disclosure provides improved apparatus and methods for maintaining the condition of the sealing heads 23. By way of example, FIG. 13 shows pictures of a sealing head cleaned by a prior art process. In this prior art process the sealing head 23 has been cleaned by applying a rotating wire brush to dislodge the residue. After 3,000 cleaning cycles the pitting and damage 92 to the sealing head is clearly visible. By contrast FIG. 14 shows a sealing head 23 of the same type after 17,000 cleaning cycles using ablation according to the present disclosure. The condition of the sealing head 23 is clearly markedly better than that shown in FIG. 13.

Further aspects of the present disclosure are set out in the following clauses.

CLAUSES

Clause 1. A method of cleaning a sealing head of a capsule filling line, comprising operating an ablation unit to irradiate the sealing head to ablate a residue off the sealing head.

Clause 2. The method of clause 1, wherein the ablation unit comprises a laser and operating the ablation unit includes energising the laser to laser ablate the residue off the sealing head.

Clause 3. The method of clause 2, wherein the laser is controlled to sweep, one or more times, a laser beam across the sealing head.

Clause 4. The method of any preceding clause, further comprising:
engaging the ablation unit with the sealing head prior to operating the ablation unit to irradiate the sealing head; and
disengaging the ablation unit from the sealing head after operating the ablation unit to irradiate the sealing head.

Clause 5. The method of clause 4, wherein engaging the ablation unit with the sealing head comprises engaging a housing of the ablation unit over or against the sealing head.

Clause 6. The method of clause 4 or clause 5, wherein engaging the ablation unit with the sealing head comprises moving the sealing head from a sealing orientation to a cleaning orientation.

Clause 7. The method of clause 6, wherein moving the sealing head into the cleaning orientation comprises rotating the sealing head by greater than 30 degrees, optionally by greater than 45 degrees, optionally by greater than 60 degrees, preferably by 90 degrees, optionally by up to 120 degrees.

Clause 8. The method of clause 6 or clause 7, wherein in the sealing orientation the sealing head faces downwards.

Clause 9. The method of any one of clauses 6 to 8, wherein in the cleaning orientation the sealing head faces sideways.

Clause 10. The method of any one of clauses 4 to 9, wherein after disengaging the ablation unit from the sealing head the method further comprises rotating the sealing head back into the sealing orientation.

Clause 11. The method of any one of clauses 4 to 10, wherein engaging the ablation unit with the sealing head comprises moving the ablation unit from a retracted location to an engaged location.

Clause 12. The method of clause 11, wherein in the engaged location a laser of the ablation unit is directed sideways.

Clause 13. The method of clause 11 or clause 12, wherein moving the ablation unit into the engaged location comprises translating the ablation unit in one or more axes.

Clause 14. The method of any one of clauses 11 to 13, wherein after disengaging the ablation unit from the sealing head the method further comprises translating the ablation unit back into the retracted location.

Clause 15. The method of any preceding clause, further comprising exhausting gases from a vicinity of the sealing head during ablation of the residue.

Clause 16. The method of any preceding clause, further comprising catching dislodged residue beneath the sealing head which is dislodged from the sealing head during ablation.

Clause 17. The method of clause 16, further comprising providing a hopper for catching the dislodged residue.

Clause 18. The method of any preceding clause, wherein the sealing head is a thermal sealing head.

Clause 19. The method of any preceding clause, wherein the sealing head is configured for sealing a capsule lid onto a capsule body; and optionally for heat sealing a capsule lid onto a capsule body; and optionally for cutting a capsule lid from a sheet of lid material and heat sealing the capsule lid onto a capsule body.

Clause 20. The method of any preceding clause, wherein the residue comprises a powder or granulate.

Clause 21. The method of any preceding clause, wherein the residue comprises an ingredient residue left over from filling capsules with one or more powder ingredients.

Clause 22. The method of clause 21, wherein the ingredient residue comprises one or more of chocolate powder, coffee granules, coffee powder, tea powder, milk powder, sugar, soup powder, flavourings and creamer powder.

Clause 23. The method of any preceding clause, wherein the residue comprises a capsule residue left over from sealing capsules.

Clause 24. The method of clause 23, wherein the capsule residue comprises plastic, for example polypropylene, polyethylene, polystyrene, or polyester, or aluminium Clause 25. The method of any preceding clause, further comprising providing a sealing head unit comprising a plurality of sealing heads that form a sealing head array and operating the ablation unit to irradiate the sealing head array to ablate a residue off the plurality of sealing heads.

Clause 26. A method of operating a capsule filling line, comprising:
i) supplying the capsule filling line with a supply of capsule bodies and a supply of comestible product;
ii) operating the capsule filling line such that a plurality of filled capsules are produced by at least partially filling each capsule body with the comestible product and operating a sealing head of the capsule filling line to seal each capsule body with a capsule lid; and iii) intermittently cleaning the sealing head of the capsule filling line;

wherein cleaning the sealing head comprises operating an ablation unit of the capsule filling line to irradiate the sealing head to ablate a residue off the sealing head.

Clause 27. The method of clause 26, wherein the ablation unit comprises a laser and operating the ablation unit includes energising the laser to laser ablate the residue off the sealing head.

Clause 28. The method of clause 26 or clause 27, further comprising:

engaging the ablation unit with the sealing head prior to operating the ablation unit to irradiate the sealing head; and disengaging the ablation unit from the sealing head after operating the ablation unit to irradiate the sealing head.

Clause 29. The method of clause 28, wherein engaging the ablation unit with the sealing head comprises engaging a housing of the ablation unit over or against the sealing head.

Clause 30. The method of clause 28 or clause 29, wherein engaging the ablation unit with the sealing head comprises moving the sealing head from a sealing orientation to a cleaning orientation.

Clause 31. The method of clause 30, wherein moving the sealing head into the cleaning orientation comprises rotating the sealing head by greater than 30 degrees, optionally by greater than 45 degrees, optionally by greater than 60 degrees, preferably by 90 degrees, optionally by up to 120 degrees.

Clause 32. The method of clause 30 or clause 31, wherein in the sealing orientation the sealing head faces downwards.

Clause 33. The method of any one of clauses 30 to 32, wherein in the cleaning orientation the sealing head faces sideways.

Clause 34. The method of any one of clauses 28 to 33, wherein after disengaging the ablation unit from the sealing head the method further comprises rotating the sealing head back into the sealing orientation.

Clause 35. The method of any one of clauses 28 to 34, wherein engaging the ablation unit with the sealing head comprises moving the ablation unit from a retracted location to an engaged location.

Clause 36. The method of clause 35, wherein in the engaged location a laser of the ablation unit is directed sideways.

Clause 37. The method of clause 35 or clause 36, wherein moving the ablation unit into the engaged location comprises translating the ablation unit in one or more axes.

Clause 38. The method of any one of clauses 35 to 37, wherein after disengaging the ablation unit from the sealing head the method further comprises translating the ablation unit back into the retracted location.

Clause 39. The method of any one of clauses 26 to 38, further comprising exhausting gases from a vicinity of the sealing head during ablation of the residue using an exhaust system of the capsule filling line.

Clause 40. The method of any one of clauses 26 to 39, further comprising catching dislodged residue beneath the sealing head which is dislodged from the sealing head during ablation.

Clause 41. The method of clause 40, further comprising providing a hopper for catching the dislodged residue.

Clause 42. The method of any one of clauses 26 to 41, wherein the sealing head is a thermal sealing head; and optionally wherein the sealing head is a combined lid cutter and thermal sealing head.

Clause 43. The method of any one of clauses 26 to 42, wherein the residue comprises a powder or granules derived from the comestible product.

Clause 44. The method of any one of clauses 26 to 43, wherein the comestible product comprises a powdered or granulated product; optionally a powdered or granulated beverage product.

Clause 45. The method of any one of clauses 26 to 44, wherein the residue comprises one or more of chocolate powder, coffee granules, coffee powder, tea powder, milk powder, sugar, soup powder, flavourings and creamer powder.

Clause 46. The method of any one of clauses 26 to 45, wherein the residue comprises a capsule residue left over from sealing the capsules.

Clause 47. The method of clause 46, wherein the capsule residue comprises plastic, for example polypropylene, polyethylene, polystyrene, or polyester, or aluminium Clause 48. The method of any one of clauses 26 to 47, wherein the capsule filling line comprises a sealing head unit comprising a plurality of sealing heads arranged as a sealing head array; and the method comprises operating the ablation unit to irradiate the sealing head array to ablate a residue off the plurality of sealing heads.

Clause 49. An ablation unit for a capsule filling line comprising:

a support frame for mounting the ablation unit to the capsule filling line;

a radiation emitter for irradiating a sealing head of the capsule filling line;

a housing at least partially surrounding the radiation emitter, the housing comprising an opening permitting, in use, passage of radiation from the radiation emitter towards the sealing head;

a transmission for movement of the housing and radiation emitter between a retracted location and an engaged location.

Clause 50. The ablation unit of clause 49, wherein the radiation emitter is a laser.

Clause 51. The ablation unit of clause 49 or clause 50, wherein the radiation emitter is mobile within the housing and configured to be traversable along at least one axis of the housing to sweep radiation across a sealing head or plurality of sealing heads.

Clause 52. The ablation unit of any one of clauses 49 to 51, wherein the opening of the housing is engageable over or against the sealing head or a sealing head unit to define a substantially enclosed volume containing the sealing head and the radiation emitter.

Clause 53. The ablation unit of any one of clauses 49 to 52, wherein in the engaged location the opening of the housing and the radiation emitter is directed sideways.

Clause 54. The ablation unit of any one of clauses 49 to 53, wherein the transmission is configured to move the ablation unit into the engaged location by translating the ablation unit in one or more axes relative to the support frame.

Clause 55. The ablation unit of any one of clauses 49 to 54, further comprising an exhaust system for exhausting gases from the vicinity of the sealing head.

Clause 56. The ablation unit of clause 55, wherein the exhaust system comprises a plurality of exhaust apertures in the housing which are connected to an exhaust by an exhaust manifold.

Clause 57. The ablation unit of clause 56, wherein the plurality of exhaust apertures are located on an upper face of the housing.

Clause 58. The ablation unit of any one of clauses 49 to 57, further comprising a hopper beneath the sealing head for catching dislodged residue.

Clause 59. A capsule filling line comprising:
a supply of capsule bodies;
a supply of comestible product; and
a conveyor for moving components from a filling station to a sealing station;
the filling station being configured to at least partially fill a capsule body obtained from the supply of capsule bodies with comestible product obtained from the supply of comestible product;
the sealing station comprising a sealing head unit comprising at least one sealing head and being configured to receive the capsule body that is at least partially filled with comestible product and seal said capsule body with a capsule lid;
the capsule filling line further comprising the ablation unit of any one of clauses 49 to 58 for intermittently cleaning the sealing head of the sealing station.

Clause 60. The capsule filling line of clause 59, wherein the at least one sealing head is a thermal sealing head; and optionally wherein the at least one sealing head is at least one combined lid cutter and thermal sealing head.

Clause 61. The capsule filling line of clause 59 or clause 60, wherein the sealing head unit comprises an array of sealing heads for simultaneously sealing each of a plurality of capsule bodies with a capsule lid.

Clause 62. The capsule filling line of any one of clauses 59 to 61, wherein the sealing head unit is movable between a sealing orientation and a cleaning orientation.

Clause 63. The capsule filling line of clause 62, wherein in the sealing orientation the sealing head unit faces downwards.

Clause 64. The capsule filling line of clause 62 or clause 63, wherein in the cleaning orientation the sealing head unit faces sideways.

Clause 65. The capsule filling line of any one of clauses 59 to 64, wherein the comestible product comprises one or more of chocolate powder, coffee granules, coffee powder, tea powder, milk powder, sugar, soup powder, flavourings and creamer powder.

Clause 66. The capsule filling line of any one of clauses 59 to 65, wherein the capsule bodies comprise plastic, for example polypropylene, polyethylene, polystyrene, polyester, or a laminate of two or more of these materials, or aluminium Clause 67. The capsule filling line of any one of clauses 59 to 66, wherein the capsule lid comprises a heat seal layer; optionally a heat seal layer comprising a thermoplastic; optionally wherein the capsule lid comprises a laminate; optionally wherein the capsule lid comprises a flexible die-cut laminate lid.

Clause 68. The capsule filling line of any one of clauses 59 to 66, wherein the capsule lid is cut from a sheet of lid material.

It is to be understood that at least some of the figures and descriptions of the disclosure have been simplified to focus on elements that are relevant for a clear understanding of the disclosure, while eliminating, for purposes of clarity, other elements that the reader skilled in the art will appreciate may also be required. Because such elements are well known to the reader skilled in the art, and because they do not necessarily facilitate a better understanding of the disclosure, a description of such elements is not provided herein.

The invention claimed is:

1. A method of cleaning a sealing head of a capsule filling line comprising:
providing a sealing head unit comprising a plurality of sealing heads that form a sealing head array; and
operating an ablation unit to irradiate the sealing head array to ablate a residue off the plurality of sealing heads;
the method further comprising engaging the ablation unit with the plurality of sealing heads prior to operating the ablation unit to irradiate the plurality of sealing heads such that a housing of the ablation unit is engaged over or against the plurality of sealing heads; and
disengaging the ablation unit from the plurality of sealing heads after operating the ablation unit to irradiate the plurality of sealing heads.

2. The method of claim 1, wherein the ablation unit comprises a laser and operating the ablation unit includes energising the laser to laser ablate the residue off the plurality of sealing heads.

3. The method of claim 1, wherein each of the plurality of sealing heads is configured for heat sealing a capsule lid onto a capsule body.

4. The method of claim 1, wherein the residue comprises an ingredient residue left over from filling capsules with one or more powder ingredients.

5. The method of claim 1, wherein the residue comprises a capsule residue left over from sealing capsules.

6. The method of claim 1, wherein engaging the ablation unit with the plurality of sealing heads further comprises moving the plurality of sealing heads from a sealing orientation to a cleaning orientation.

7. The method of claim 6, wherein moving the plurality of sealing heads from the sealing orientation to the cleaning orientation comprises rotating the sealing head array by greater than 30 degrees.

8. The method of claim 1, wherein the ablation unit comprises a radiation emitter mobile within the housing and configured to be traversable along at least one axis of the housing to sweep radiation across the plurality of sealing heads.

9. The method of claim 1, wherein during the step of engaging the ablation unit with the plurality of sealing heads the housing of the ablation unit is at an engaged location that defines a substantially enclosed volume containing the plurality of sealing heads and a radiation emitter of the ablation unit.

10. The method of claim 1, wherein disengaging the ablation unit comprises retracting the housing away from the plurality of sealing heads into a retracted location.

11. A method of operating a capsule filling line, comprising:
i) supplying the capsule filling line with a supply of capsule bodies and a supply of comestible product;
ii) operating the capsule filling line such that a plurality of filled capsules are produced by at least partially filling each capsule body with the comestible product and operating a sealing head unit of the capsule filling line that comprises a plurality of sealing heads that form a sealing head array to seal each capsule body with a capsule lid; and iii) intermittently cleaning the plurality of sealing heads of the capsule filling line;

wherein cleaning the plurality of sealing heads comprises:

engaging an ablation unit with the plurality of sealing heads such that a housing of the ablation unit is engaged over or against the plurality of sealing heads;

operating the ablation unit of the capsule filling line to irradiate the plurality of sealing heads to ablate a residue off the plurality of sealing heads; and disengaging the ablation unit from the plurality of sealing heads.

12. The method of claim 11, wherein the ablation unit comprises a laser and operating the ablation unit includes energising the laser to laser ablate the residue off the plurality of sealing heads.

13. The method of claim 11, wherein the residue comprises a powder or granulate, optionally one or more of chocolate powder, coffee granules, coffee powder, tea powder, milk powder, sugar, soup powder, flavourings and creamer powder.

14. The method of claim 11, wherein the residue comprises a capsule residue left over from sealing the capsules.

15. The method of claim 11, wherein during the step of engaging the ablation unit with the plurality of sealing heads the housing of the ablation unit is at an engaged location that defines a substantially enclosed volume containing the plurality of sealing heads and a radiation emitter of the ablation unit.

16. The method of claim 11, wherein disengaging the ablation unit comprises retracting the housing away from the plurality of sealing heads into a retracted location.

* * * * *